United States Patent
Straub

(10) Patent No.: US 6,244,508 B1
(45) Date of Patent: *Jun. 12, 2001

(54) DOCUMENT OF VALUE HAVING TWO SEPERATE CORRESPONDING DATA

(75) Inventor: Walter Straub, Oiching (DE)

(73) Assignee: Giesecke & Devrient GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,074

(22) Filed: Dec. 1, 1997

(30) Foreign Application Priority Data

Dec. 2, 1996 (DE) .............................. 196 49 874

(51) Int. Cl.⁷ ...................................... G06K 7/08
(52) U.S. Cl. ..................... 235/449; 235/491; 235/493
(58) Field of Search .................... 235/449, 462, 235/472, 468, 491, 493, 462.01, 380, 487

(56) References Cited

U.S. PATENT DOCUMENTS

| | | | |
|---|---|---|---|
| 3,468,046 | * 9/1969 | Makishima | 235/449 |
| 3,676,644 | * 7/1972 | Vaccaro et al. | 235/61.11 D |
| 3,760,161 | * 9/1973 | Lohne et al. | 235/449 |
| 3,800,142 | * 3/1974 | Harshaw, II | 250/337 |
| 4,013,894 | * 3/1977 | Foote et al. | 235/61.12 R |
| 4,202,491 | * 5/1980 | Suzuki | 235/491 |
| 4,641,017 | * 2/1987 | Lopata | 235/457 |
| 4,684,795 | * 8/1987 | Colgate, Jr. | 235/457 |
| 4,725,718 | * 2/1988 | Sansone et al. | 235/495 |
| 4,983,817 | * 1/1991 | Dolash et al. | 235/462 |
| 5,237,164 | * 8/1993 | Takada | 235/487 |
| 5,336,871 | * 8/1994 | Colgate, Jr. | 235/380 |
| 5,545,883 | * 8/1996 | Sasou et al. | 235/449 |
| 5,554,842 | * 9/1996 | Connell et al. | 235/491 |
| 5,661,289 | * 8/1997 | Sasou et al. | 235/449 |

FOREIGN PATENT DOCUMENTS 24 58 705 A1  9/1975 (DE) .

* cited by examiner

Primary Examiner—Karl D. Frech
Assistant Examiner—Daniel St. Cyr
(74) Attorney, Agent, or Firm—Bacon & Thomas

(57) ABSTRACT

A document of value, such as a check or ID card or the like, having information specific to the document, in particular user-related data. The document having at least one luminescent area which is partially masked so as to yield a coding which is machine-readable and correlated at least with parts of the specific information in order to permit authenticity testing.

16 Claims, 1 Drawing Sheet

DOCUMENT OF VALUE HAVING TWO SEPERATE CORRESPONDING DATA

BACKGROUND OF THE INVENTION

1. Field of the Invention

This invention relates to a document of value, such as a check or ID card or the like, having information specific to the document, in particular user-related data, and to a method for testing the authenticity of the document of value.

2. Related Art

In view of modern reproduction techniques, in particular the rising quality of color copiers, it is becoming ever easier to reproduce documents of value with relatively little effort. This increases the danger of forgeries.

In order to counteract this development one has proposed protecting papers of value by a special coding (DE 24 58 705 A1). Individual parameters of the document, such as characteristic color or print properties, are measured and deposited on the document in coded form. If the coding is to be invisible to the eye one can use luminescent printing inks which are transparent in the visible spectral region. When checking the authenticity of the document one measures the characteristic parameters and compares them with the measuring data stored on the document in coded form.

This procedure offers good protection from forgery as long as the documents of value are coded centrally in protected surroundings and luminescent substances are used which are virtually unavailable commercially.

In the case of check forms having user-related information, such as the account number, it is frequently also useful to include these data in the coding in order to ensure that these data have not been manipulated (i.e., altered). However, checks are usually personalized in decentralized fashion, i.e. the blank forms are produced centrally and then passed on to the issuing bank which applies the user-related data. To permit the method known from DE 24 58 705 A1 to be applied to the user-related data of the check, each bank would therefore have to be equipped with the corresponding devices for applying the coding and in particular the corresponding luminescent substances. This would sacrifice part of the forgery-proof effect since it would make the equipment required for coding much more easily accessible and thus increase the danger of misuse.

The invention is therefore based on the problem of proposing a document of value which avoids the disadvantages of the prior art.

BRIEF SUMMARY OF THE INVENTION

The inventive paper of value has in a certain area a luminescent background partially masked by a color contrasting substance, e.g. a nonluminescent printing ink. The shape and arrangement of the mask result in a coding which is correlated with data specific to the document.

When the coding is read the document is illuminated with excitation radiation for the luminescent substance. A detector which is sensitive only in the spectral region of the luminescent radiation will recognize only the luminescent areas as "light" areas. The rest of the document and the mask in the luminescent area will appear dark to the sensor, provided the mask does not (substantially) reflect or emit in the wave range of the luminescent radiation. In this way a strong contrast between background and mask is produced which permits easy reading of the coding.

At the same time the inventive document has the crucial advantage that the luminescent background can be designed the same way for all documents of value and thus be decoupled from the coding or personalizing process. It is thus possible to apply the luminescent background centrally in protected surroundings, the mask being applied in the form of a coding at a later time, e.g. during personalization of the document of value. For the mask one can use conventional printing inks.

The background, however, is preferably applied using special luminescent substances which are virtually unavailable commercially. This has the additional advantage that when checking the element one can ascertain in a first step whether the luminescent substance is "authentic" with reference to one or more measurable, characteristic properties of the luminescent substance.

According to a preferred embodiment the document of value has a luminescent background stripe applied to a suitable place on the document. The coded information in the form of a bar code, preferably containing portions of the user-related data, is printed in the luminescent stripe using a conventional printing process, e.g. by a laser printer, matrix printer or offset printing machine.

Finally, one can further increase the protection from forgery by applying the luminescent background, not as an all-over coating, but in the form of geometrical structures which are small yet resolvable visually or by machine. This permits better recognition of any attempts at alterations in the area of the background. If an attempt is made to change the mask with chemical means, the structures blur. If a luminescent substance emitting in the visible spectral region is used, for example, these changes can be recognized very easily upon excitation of the substance, so that it is possible to discover alterations even without machine testing of the correspondence between code and read information.

According to a further inventive embodiment the document can additionally be provided with magnetic information which is correlated with the coded information in the area of the luminescent background. In the simplest case the basic information to be represented in both ways is coded once and deposited on the document of value merely in different modes of representation, once by application of magnetic material and once by masking a luminescent background. According to a variant one can also use different coding algorithms for the different forms of representation of the code. It is also conceivable for the magnetic code and the code represented by the luminescent substance to represent different pieces of information which complement each other or have a certain mutual relationship.

During authenticity testing or the document, both coded pieces of information are read and checked for agreement or for the predetermined mutual relationship. By reason of the special testing method for the code represented with the aid of the luminescent background, one can simultaneously ascertain whether alterations have been performed in the luminescent area or on the magnetic information.

This is because when the coded information in the area of the luminescent background is read the detector quasi simultaneously recognizes the printed coding, i.e. the mask itself, and records the signal of the luminescent background. In the area of the coding, i.e. the mask of the luminescent background, this signal is very small or almost zero. Consequently there is a direct correlation between the two signal curves measured by the detector, which is absent only in the case of alterations.

Further embodiments and advantages of the invention will be explained with reference to the figures, in which:

DETAILED DESCRIPTION

Figure 1:
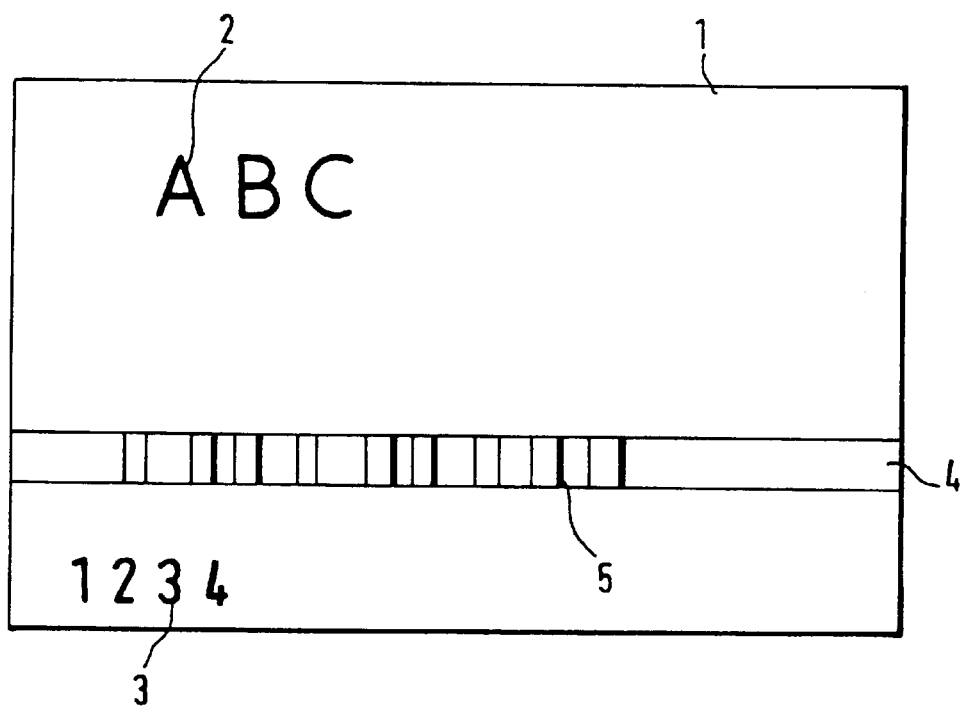
FIG. 1 shows a drawing of an inventive document of value.

The figure shows inventive document of value 1, such as a check, ID card, transportation ticket, or the like. Document of value 1 has general data 2 which are present on each of the documents, such as information on the issuing institute or a background print. Additionally, document of value 1 also bears individualizing data 3 that individualizes the document. These can be for example separately applied information, such as the account number or a check user. They may be other individualizing information contained inherently in the document, however, such as certain characteristic print or color properties. According to the invention, document 1 finally has luminescent area 4, shown here in the form of a stripe. However, area 4 can also have any other outline form or consist of a plurality of separate luminescent areas. Luminescent area 4 is partially masked by application of layer code or mask 5 which does not (substantially) reflect or emit in the wave range of the luminescent radiation of the luminescent area 4 in the form of a stripe. The intervals or the form of mask 5 represent a coding which is correlated with individualizing data 3 of document 1. Mask 5 can be applied in the form of a bar code, but also in the form of other geometrical structures or configurations disposed in spaced apart areas.

Such a document is preferably produced in two stages. In a first step one produces a blank, for example a check form, which bears general data 2. This production is preferably done centrally, for example in a paper mill in the case of checks. During or directly following this production process one produces luminescent area 4 on the document by applying a luminescent substance to the document material. This can be done by coating or printing the luminescent substance. As luminescent substances one can fundamentally use any luminescent substances, but it is preferable to use substances which are transparent in the visible spectral region and luminesce in the visible or invisible spectral region.

The thus produced document blanks are provided with the individualizing data or coding in a second step. With check forms, for example, this personalizing step is done at the particular issuing banks. Individualizing data 3 are printed here. Simultaneously at least part of these user-related data is coded and applied to luminescent area 4 in the form of code 5. Code or mask 5 is preferably printed by a conventional laser printer.

In order to facilitate the printing of luminescent area 4 one can also admix substances to the printing ink which fluoresce in the visible spectral region and allow a fast visual check of the printing operation. In this way one can easily ascertain whether the printing units are working properly.

Figure 2:
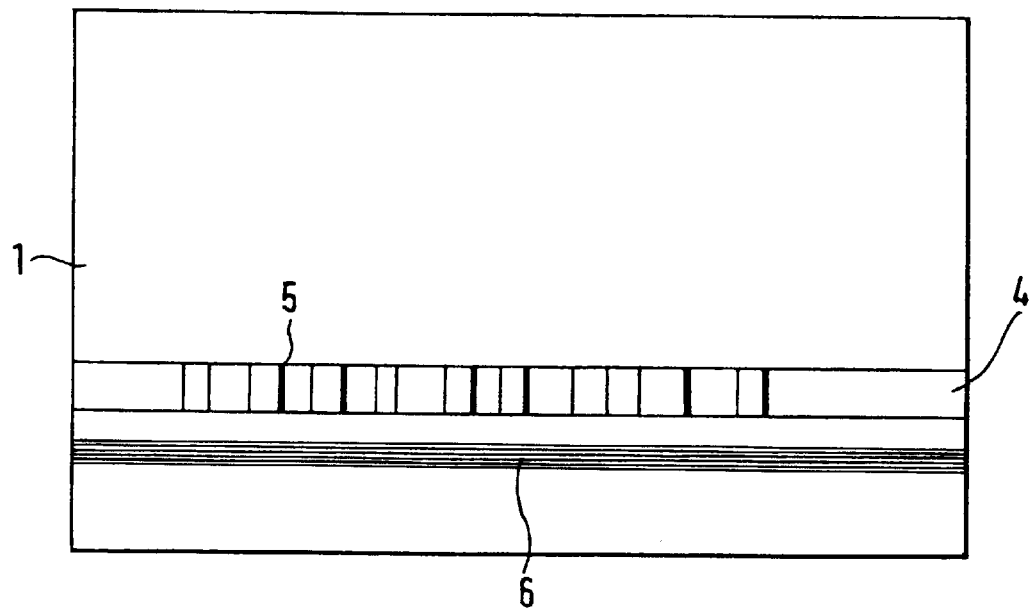
FIG. 2 shows a variant of the inventive document of value.

FIG. 2 shows a variant of inventive document of value 1. This document likewise has luminescent area 4 partially masked by layer or mask 5 which does not (substantially) reflect or emit in the wave range of the luminescent radiation of the luminescent area 4 in the form of a stripe. Document of value 1 further has magnetic track 6 in which coded information is likewise stored. The information represented by mask 5 and the information stored in magnetic track 6 are correlated. This correlation can arise in very different ways. It is thus conceivable, as explained above in connection with FIG. 1, to code certain individualizing data and deposit this code in the form of mask 5 on luminescent area 4 on document of value 1 in one case and store it likewise in coded form in magnetic stripe 6 in the other case. For coding the individualizing data 3 one can select the same coding algorithm in each case or for each mode of representation of the coding a separate algorithm.

One can of course also select different correlation criteria instead of the individualizing data of the document of value itself.

Also, it is unnecessary to store the magnetic coding in a magnetic stripe, as shown in FIG. 2 This coding can equally well consist of a print produced on the document of value with the aid of magnetic inks.

During authenticity testing of the document of value a detector quasi simultaneously scans coding or mask 5 and measures the emission signal of the luminescent area 4 in the form of a background stripe. In the areas of coding or the mask 5 the emission signal has minima. If this signal curve has a minimum at a place where the detector ascertains no corresponding coding character, it is clear that the coding has been altered.

If the test of the luminescent area 4 in the form of a stripe shows that the coding was not altered, the information contained in coding or mask 5 is compared with the information stored in magnetic track 6 in the form of a stripe and tested for correspondence. If this comparison shows discrepancies, the magnetic coding has been altered.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A document of value comprising;

information specific to the document on the document of value;

at least one luminescent area in addition to and separate from the information specific to the document;

a coding on the document of value; and a mask positioned on the document of value, such that the luminescent area is partially masked by the mask so as to yield the coding, the coding is machine-readable and correlated at least with parts of the information specific to the document in order to permit authenticity testing.

2. The document of value of claim 1, wherein the luminescent area is in the form of a stripe.

3. The document of value of claim 1, wherein the luminescent area has a substance which luminesces in the invisible spectral region.

4. The document of value of claim 3, wherein the luminescent area additionally has a substance which fluoresces in the visible spectral region.

5. The document of value of claim 1, wherein the luminescent area includes a luminescent substance in the form of small yet visually recognizable structures.

6. The document of value of claim 1, wherein the coding absorbs in the visible spectral region.

7. The document of value of claim 1, wherein the coding is in the form of geometrical configurations which are disposed in spaced apart areas.

8. The document of value of claim 1, wherein the document of value has magnetic information which is correlated with the coding.

9. The document of value of claim 8, wherein the document includes a magnetic stripe and wherein the magnetic information is stored in the magnetic stripe.

10. A method for producing a document of value, having information specific to the document, the steps comprising:

providing the document with a luminescent area in one location of the document that is separate from the information specific to the document;

partially masking the luminescent area with a mask at a later time so as to yield a coding which is machine-readable; and correlating the luminescent area coded by the mask at least with parts of the information specific to the document in order to permit authenticity testing.

11. The method of claim 10, further including the steps of providing the document, with a luminescent substance in at least one predetermined area of the document, and masking the luminescent substance partially with a different substance which absorbs light at least in the spectral region of the luminescent radiation.

12. The method of claim 10, wherein the mask is configured in the form of spaced apart geometrical configurations.

13. The method of claim 12, wherein the coding is defined by the spacing between the geometrical configurations.

14. The method of claim 10, wherein the mask is applied by a printer selected from the group consisting of a laser printer, a matrix printer and an offset printing machine.

15. A method for testing the authenticity of a document of value comprising information specific to the document on the document of value, at least one luminescent area in addition to and separate from the information specific to the document, a coding on the document of value and a mask positioned on the document of value, such that the luminescent area is partially masked by the mask so as to yield the coding, the coding is machine-readable and correlated at least with parts of the information specific to the document in order to permit authenticity testing, the steps comprising:

detecting the masked area to obtain a first signal;

exciting and detecting the emission of radiation of the luminescent area to obtain a second signal; and comparing the first and second signals to recognize alteration of the document.

16. A document of value comprising;

user-related data on the document of value;

at least one luminescent area in addition to and separate from the user-related data;

a coding on the document of value; and a mask positioned on the document of value, such that the luminescent area is partially masked by the mask so as to yield the coding, the coding is machine-readable and correlated at least with parts of the user-related data in order to permit authenticity testing.

* * * * *